(12) United States Patent
Masui et al.

(10) Patent No.: US 7,798,266 B2
(45) Date of Patent: Sep. 21, 2010

(54) HYBRID SYSTEM

(75) Inventors: Takatoshi Masui, Mishima (JP);
Makoto Suzuki, Mishima (JP); Makoto Hotta, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 516 days.

(21) Appl. No.: 11/792,116

(22) PCT Filed: Nov. 28, 2005

(86) PCT No.: PCT/JP2005/022237

§ 371 (c)(1),
(2), (4) Date: Jun. 1, 2007

(87) PCT Pub. No.: WO2006/062046

PCT Pub. Date: Jun. 15, 2006

(65) Prior Publication Data

US 2008/0230287 A1    Sep. 25, 2008

(30) Foreign Application Priority Data

Dec. 8, 2004    (JP)  ............................. 2004-355870

(51) Int. Cl.
B60W 10/04    (2006.01)
B60W 10/28    (2006.01)

(52) U.S. Cl. ............................ 180/65.265; 180/65.275; 903/930; 903/944; 701/22

(58) Field of Classification Search ............ 180/65.265, 180/65.275, 65.28, 65.285, 65.29; 903/908, 903/930, 944; 701/22
See application file for complete search history.

(56) References Cited

U.S. PATENT DOCUMENTS

| | | | | |
|---|---|---|---|---|
| 4,305,254 | A * | 12/1981 | Kawakatsu et al. | .......... 60/716 |
| 6,445,982 | B1 * | 9/2002 | Swales et al. | ................. 701/22 |
| 6,447,417 | B2 * | 9/2002 | Kanehisa | ........................ 475/5 |
| 6,672,415 | B1 * | 1/2004 | Tabata | ..................... 180/65.25 |
| 6,817,432 | B2 * | 11/2004 | Kitada et al. | ........... 180/65.245 |
| 6,868,927 | B2 * | 3/2005 | Boll et al. | ................ 180/65.23 |
| 7,147,072 | B2 * | 12/2006 | Botti | ....................... 180/65.25 |
| 7,301,302 | B2 * | 11/2007 | Yoshii | ......................... 320/104 |
| 2003/0141122 | A1 | 7/2003 | Boll et al. | |
| 2004/0079564 | A1 | 4/2004 | Tabata | |

FOREIGN PATENT DOCUMENTS

| | | |
|---|---|---|
| EP | 1 199 205 A2 | 4/2002 |
| JP | A-07-240212 | 9/1995 |
| JP | A-2001-069610 | 3/2001 |
| JP | A-2002-081331 | 3/2002 |
| JP | A-2003-102107 | 4/2003 |
| WO | WO 99/19161 A1 | 4/1999 |
| WO | WO 00/19084 A1 | 4/2000 |

* cited by examiner

*Primary Examiner*—Paul N Dickson
*Assistant Examiner*—John D Walters
(74) *Attorney, Agent, or Firm*—Oliff & Berridge, PLC (57) ABSTRACT

A hybrid system includes an electrical motor generating motive power, a storing portion providing electrical power to the electrical motor, a fuel cell that provides electrical power to the electrical motor or the storing portion within a predetermined output range, an internal combustion engine absorbing loading of the fuel cell, a determination portion that determines whether the loading of the fuel cell is above the maximum output in the predetermined range, and a control portion that controls the internal combustion engine so as to operate if it is determined that the loading of the fuel cell is above the maximum output in the predetermined range.

5 Claims, 11 Drawing Sheets

Pfc_ref_max; ALLOWED MAXIMUM OUTPUT PRESET VALUE OF FUEL CELL
Pfc_ref_min; ALLOWED MINIMUM OUTPUT PRESET VALUE OF FUEL CELL
Pfc_max; ALLOWED MAXIMUM OUTPUT OF FUEL CELL
Pfc_min; ALLOWED MINIMUM OUTPUT OF FUEL CELL

HYBRID SYSTEM

TECHNICAL FIELD

This invention generally relates to a hybrid system that has a fuel cell, an electrical motor, and an internal combustion engine.

BACKGROUND ART

One or more aspects of this invention generally relates to a hybrid system that has a fuel cell, an electrical motor and an internal combustion engine.

Recently, a hybrid power supply equipment having a combination of a fuel cell and a secondary battery has been developed. The hybrid power supply equipment changes an output of the fuel cell based on increase and decrease of electrical loading. And the hybrid power supply equipment operates the fuel cell in a range under 30% of system efficiency. To resolve this problem, Japanese Application Publication No. 7-240212 proposes an efficient hybrid power supply equipment that operates a fuel cell in a limited range of output, 30% to 40%.

However, in a case of operating the fuel cell in a limited range of output, the hybrid power supply equipment may not implement the electrical loading, because electrical power to be provided to a electrical motor, auxiliaries and so on runs short if an electrical loading of the fuel cell, an electrical loading of an electrical motor or auxiliaries except for the electrical motor to be provided with an electrical power from the fuel cell, exceeds an output capacity of the fuel cell. This problem is common to a hybrid power supply equipment in which an electrical power is provided to an electrical motor directly and a hybrid power supply equipment in which an electrical power is provided to an electrical motor via a battery or the like.

Various aspects of this invention have been made in view of the above-mentioned circumstances. One or more aspects of the invention provide a hybrid system that can implement the electrical loading of the fuel cell whose output range is limited.

DISCLOSURE OF THE INVENTION

In exemplary embodiments, a hybrid system includes an electrical motor, a storing portion, a fuel cell, an internal combustion engine, a determination portion, and a control portion. The electrical motor generates motive power. The storing portion provides electrical power to the electrical motor. The fuel cell provides electrical power to the electrical motor or the storing portion within a predetermined output range. The internal combustion engine absorbs loading of the fuel cell. The determination portion determines whether the loading of the fuel cell is above the maximum output in the predetermined range. The control portion controls the internal combustion engine so as to operate if it is determined that the loading of the fuel cell is above the maximum output in the predetermined range.

These and other optional features and possible advantages of various aspects of this invention are described in, or are apparent from, the following detailed description of exemplary embodiments of systems and methods which implement this invention.

EFFECT OF THE INVENTION

In accordance with the invention, it is possible to prevent that the battery power of the storing portion runs short. In addition, it is possible to achieve stable supply of electrical power to the electrical motor. Further, it is possible to restrain the decrease of the life of the storing portion caused by over discharge. And the heat efficiency of the whole hybrid system is increased.

BRIEF DESCRIPTION OF THE DRAWINGS

Exemplary embodiments of one or more aspects of the invention will be described with reference to the following drawings, wherein.

BEST MODE FOR CARRYING OUT THE INVENTION

Figure 1:
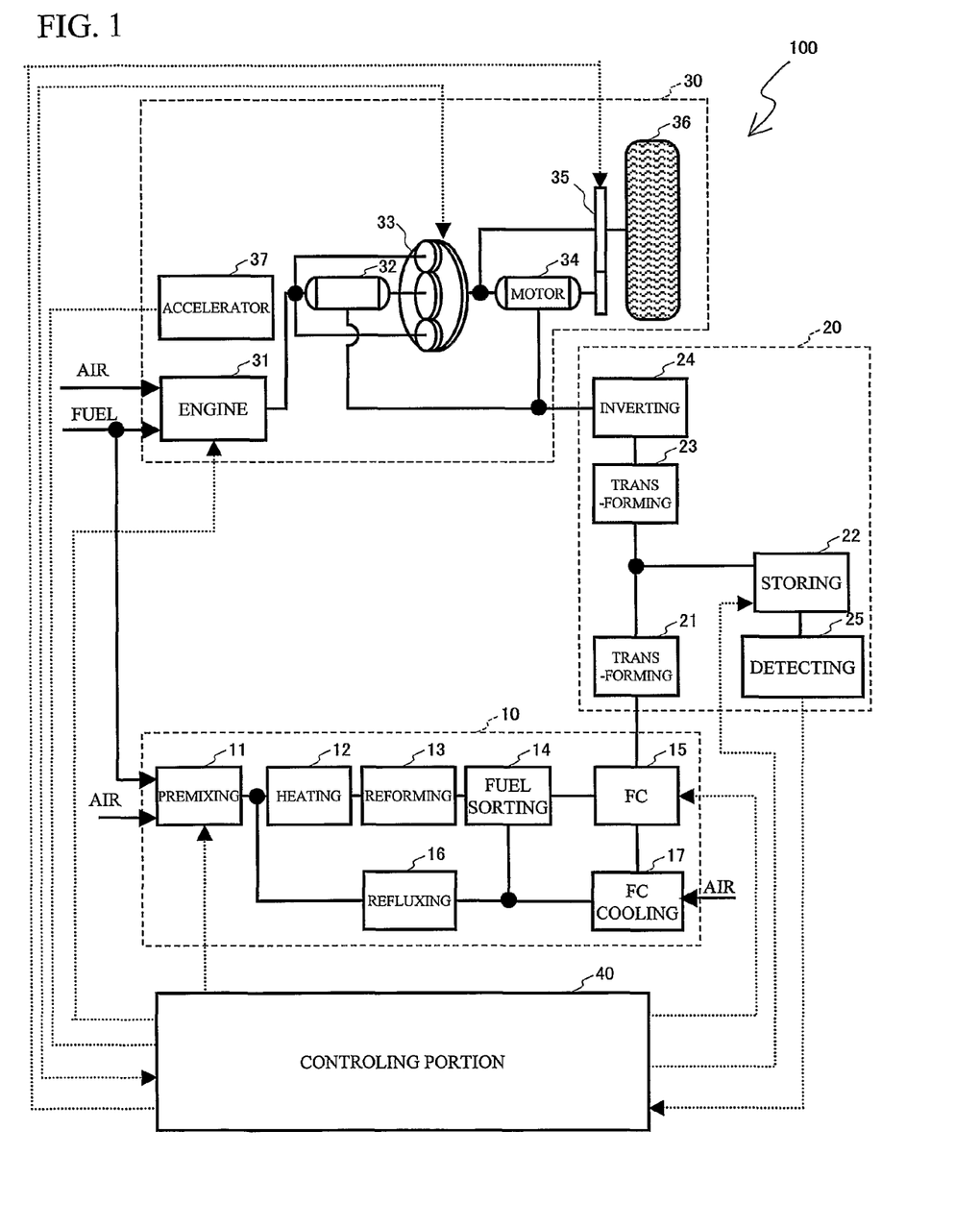
FIG. 1 illustrates a block diagram of an overall configuration of a hybrid system in accordance with the invention.

FIG. 1 illustrates a block diagram of an overall configuration of a hybrid system 100 implementing one or more aspects of the invention. As shown in FIG. 1, the hybrid system 100 may include a fuel cell unit 10, a battery unit 20, a power output unit 30 and a control unit 40.

The fuel cell unit 10 may include a premixing portion 11, a heating portion 12, a reforming portion 13, a fuel sorting portion 14, a fuel cell 15, a refluxing portion 16 and a cell cooling portion 17. The battery unit 20 may include a transforming portion 21 and 23, a storing portion 22, an inverting portion 24 and a battery power level detecting portion 25. The power output unit 30 may include an internal combustion engine 31, an electrical generator 32, an output power dividing portion 33, an electrical motor 34, a power transmitting portion 35, wheels 36 and an accelerator 37.

The premixing portion 11 may receive instructions from the control unit 40, may generate mixed gas by mixing hydrocarbon fuel and oxygen at specific rate, and may provide the mixed gas to the heating portion 12. The heating portion 12 may heat the mixed gas and provide the mixed gas to the reforming portion 13. The reforming portion 13 may generate hydrogen including fuel gas from the mixed gas, and may provide the fuel gas to the fuel sorting portion 14. The fuel sorting portion 14 may filter the fuel gas, and may separate hydrogen gas and other gas (hydrocarbon gas, carbon monoxide gas, carbon dioxide gas and nitrogen gas). The fuel sorting portion 14 may provide the hydrogen gas to the fuel cell 15, and may provide the hydrocarbon gas, the carbon monoxide gas, carbon dioxide gas and the nitrogen gas to the refluxing portion 16.

The refluxing portion 16 may provide the hydrocarbon gas, the carbon monoxide gas, the carbon dioxide gas and the nitrogen gas for use as fuel for heating or as fluid for heat recollecting, to the reforming portion 13 through the heating portion 12. And it is possible to take advantage of the hydrocarbon fuel efficiently. The fuel cell 15 may generate electrical power from the given hydrogen gas, may receive instructions from the control unit 40, and may provide the electrical power to the transforming portion 21. The cell cooling portion 17 may introduce air from outside of the hybrid system 100, may use a part of the air for cooling the fuel cell 15 and may provide the rest of the air to the refluxing portion 16.

The transforming portion 21 may transform the electrical power from the fuel cell 15, and may provide the transformed electrical power to the storing portion 22 or the transforming portion 23. The storing portion 22 may include secondary battery and so on. The storing portion 22 may receive instructions from the control unit 40, and may provide electrical power to the transforming portion 23. The transforming portion 23 may transform the given electrical power, and may provide the transformed electrical power to the inverting portion 24. The inverting portion 24 may invert the given electrical power into alternative current, and may provide the current to the electrical motor 34. The battery power level detecting portion 25 may detect a value of the battery power level of the storing portion 22, and may provide the value of the battery power level to the control unit 40.

The internal combustion engine 31 may receive instructions from the control unit 40, may generate air-fuel mixture having a specific air-fuel ratio, may generate motive power, and may provide the motive power to the output power dividing portion 33. The output power dividing portion 33 may receive instructions from the control unit 40, and may provide the motive power from the internal combustion engine to the electrical motor 34, the electrical generator 32 or the power transmitting portion 35. The electrical motor 34 may generate motive power from the electrical power provided from the inverting portion 24, and may provide the motive power to the power transmitting portion 35. When the motive power is provided to the electrical motor 34 from the output power dividing portion 33, the electrical motor 34 may generate motive power from the motive power provided from the output power dividing portion 33 and the electrical power provided from the inverting portion 24. The power transmitting portion 35 may transmit the given motive power to the wheels 36. The accelerator 37 may provide an opening angle thereof set by a user.

In addition, when the battery power level of the storing portion 22 is low or when the wheels 36 slow down, the output power dividing portion 33 may receive instructions from the control unit 40 and may provide the motive power generated in the internal combustion engine 31 to the electrical generator 32. The electrical generator 32 may generate electrical power from the given motive power and may provide the electrical power to the storing portion 22 through the inverting portion 24 and the transforming portion 23.

Figure 2:
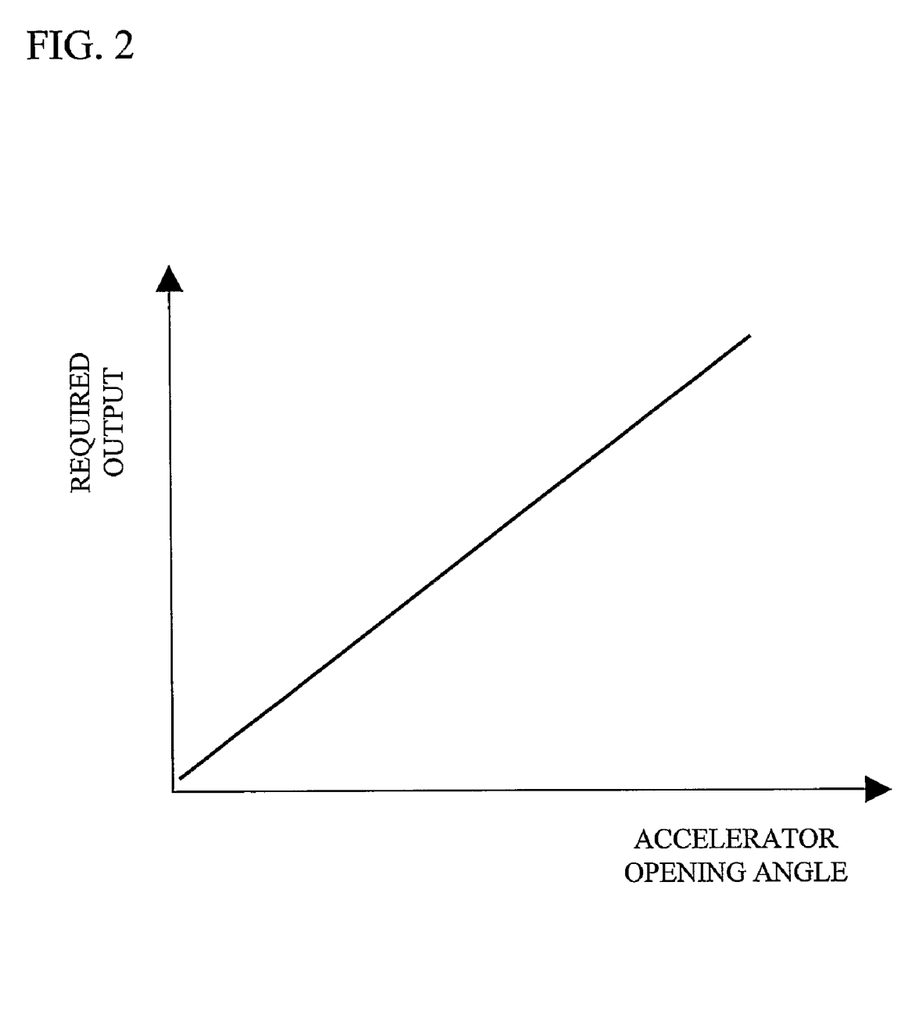
FIG. 2 illustrates a relationship between an opening angle of an accelerator and a required output.

Next, a relationship between the opening angle of the accelerator 37 and a required output will be described. FIG. 2 illustrates the relationship between the opening angle of the accelerator 37 and the required output. The vertical axis of FIG. 2 indicates the required output and the horizontal axis of FIG. 2 indicates the opening angle of the accelerator 37. As shown in FIG. 2, the opening angle of the accelerator 37 is proportional to the required output, and the required output increases as the opening angle of the accelerator 37 increases. The control unit 40 may calculate the required output from the opening angle of the accelerator 37 based on FIG. 2.

Figure 3:
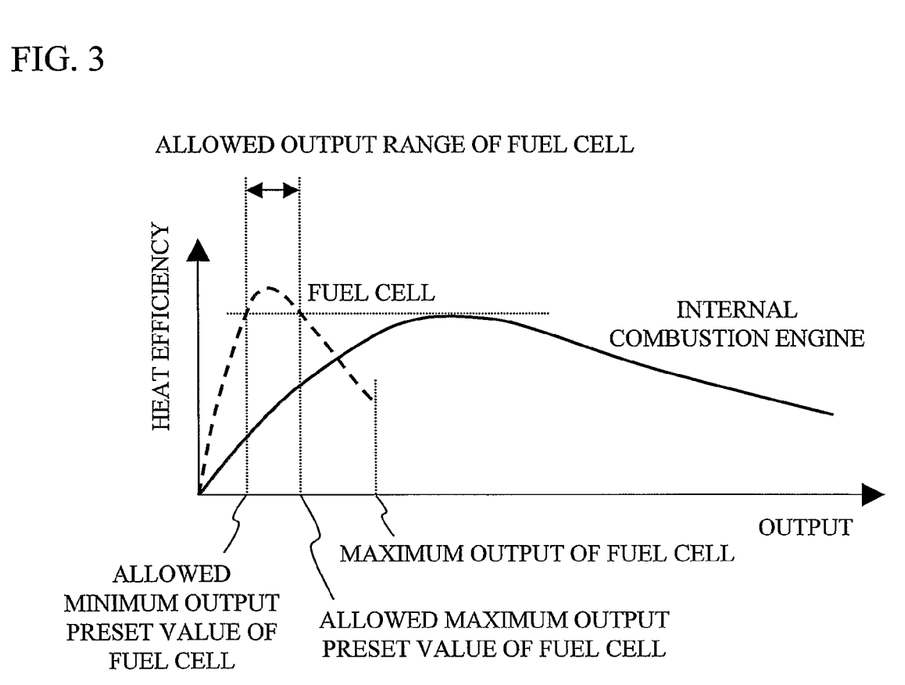
FIG. 3 illustrates a relationship between an output and a heat efficiency of an internal combustion engine and a fuel cell.

Next, an output and a heat efficiency of the internal combustion engine 31 and the fuel cell 15 will be described. FIG. 3 illustrates a relationship between the output and the heat efficiency of the internal combustion engine 31 and the fuel cell 15. The vertical axis of FIG. 3 indicates the heat efficiency of the internal combustion engine 31 and the fuel cell 15, and the horizontal axis of FIG. 3 indicates the output of the internal combustion engine 31 and the fuel cell 15.

In the description of various exemplary embodiments, the term "heat efficiency of the internal combustion engine 31" refers to the proportion of the output of the internal combustion engine 31 to the energy used by the internal combustion engine 31. "The heat efficiency of the fuel cell 15" refers to the proportion of the output of the fuel cell 15 to the energy used by the fuel cell 15.

As shown in FIG. 3, the heat efficiency of the fuel cell 15 may increase rapidly as the output of the fuel cell increases, and may decrease rapidly above the maximum heat efficiency. On the contrary, the heat efficiency of the internal combustion engine 31 may increase slowly as the output of the internal combustion engine 31 increases, and may decrease slowly above the maximum heat efficiency. This is because in a general internal combustion engine the heat efficiency decreases caused by increase of friction, decrease of admission efficiency and emission efficiency, decrease of heat efficiency and so on as the output of the internal combustion engine 31 increases.

Hereinafter, a range where the heat efficiency of the fuel cell 15 exceeds the maximum heat efficiency of the internal combustion engine 31 is named "allowed output range of fuel cell". In addition, the maximum value in the allowed output range of fuel cell is named "allowed maximum output preset value of fuel cell", and the minimum value in the allowed output range of fuel cell is named "allowed minimum output preset value of fuel cell".

When the required output is under the allowed maximum output preset value of fuel cell, the electrical motor 34 may generate motive power from the electrical power provided from the storing portion 22. When the required output is in the allowed output range of fuel cell, the electrical motor 34 may generate the motive power from the electrical power provided from the fuel cell 15 and/or the storing portion 22. When the required output is above the allowed maximum output preset value of fuel cell, the electrical motor 34 may generate the motive power from the electrical power provided from the fuel cell 15 and/or the storing portion 22, and the internal combustion engine 31 may generate the motive power if necessary. In exemplary embodiments, the heat efficiency of the whole hybrid system 100 is increased, because the fuel cell 15 may operate in high heat efficiency range and unnecessary operation of the internal combustion engine 31 having low heat efficiency is restrained.

In addition, the heat efficiency of the internal combustion engine 31 may be a proportion of the output to be provided to the electrical motor 34 from the internal combustion engine 31 to the energy used by the internal combustion engine 31. In addition, the heat efficiency of the internal combustion engine 31 may be a proportion of the electrical power to be provided to the storing portion 22 through the electrical generator 32 to the energy used by the internal combustion engine 31. Further, the heat efficiency of the fuel cell 15 may be a proportion of the output to be provided from the fuel cell 15 to the electrical motor 34 through the storing portion 22 to the energy used by the fuel cell 15. In this case, the decrease of the output efficiency of the internal combustion engine 31 and the fuel cell 15 caused by other instruments in the hybrid system 100 is reflected. And the heat efficiency of the whole hybrid system 100 is increased more appropriately.

Figure 4:
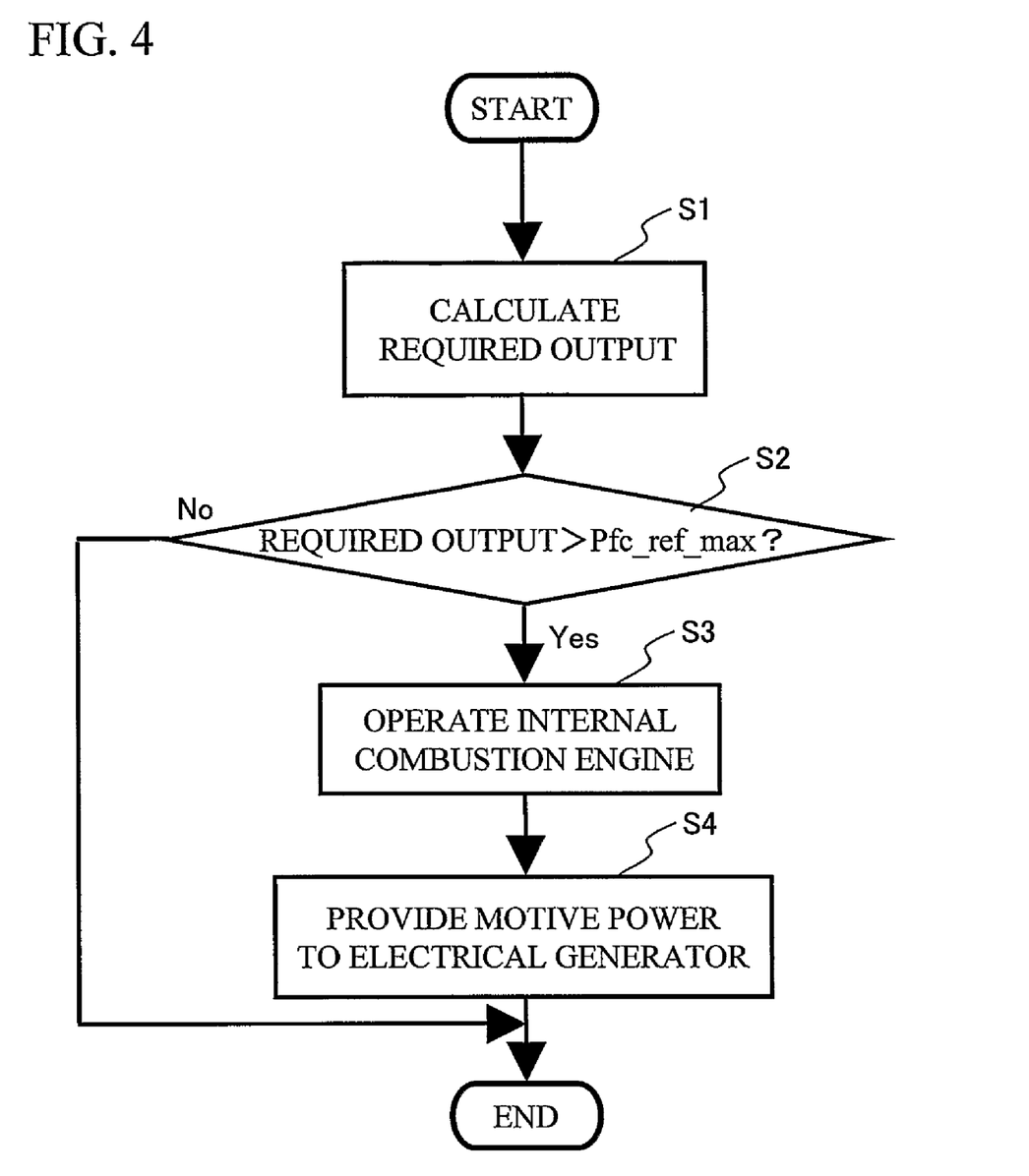
FIG. 4 illustrates flowchart of a control sequence of an internal combustion by a control unit.

A control of the internal combustion engine 31 by the control unit 40 will be described below. FIG. 4 illustrates flowchart of a control of the internal combustion engine 31 by the control unit 40. As shown in FIG. 4, the control unit 40 may receive the accelerator opening angle from the accelerator 37 and may calculate the required output (step S1). In this case, the required output may be calculated based on FIG. 2. Next, the control unit 40 may determine whether the required output is above the allowed maximum output preset value of fuel cell (step S2).

If it is determined that the required output is above the allowed maximum output preset value of fuel cell in step S2, the control unit 40 may control the internal combustion engine 31 so as to operate (step S3). Next, the control unit 40 may control the output power dividing portion 33 so as to provide the motive power generated in the internal combustion engine 31 to the electrical generator 32 (step S4). In this case, the motive power generated in the internal combustion engine 31 may be provided to the wheels 36. After step S4, the control unit 40 may start the sequence over from step S1.

If it is not determined that the required output is above the allowed maximum output preset value of fuel cell in step S2, the control unit 40 may start the sequence over from step S1. In addition, the control unit 40 may start the flow chart in a specific period.

As described above, when the battery power level of the storing portion 22 decreases, the internal combustion engine 31 may operate and the battery power level of the storing portion 22 may increase. And, it is possible to prevent the shortage of the battery power of the storing portion 22. It is therefore possible for the storing portion 22 to provide the electrical power stably to the electrical motor 34, and it is possible to restrain the decrease of the life of the storing portion 22 caused by over discharge. In addition, it is possible to restrain the unnecessary operation of the internal combustion engine 31 having low heat efficient, and the heat efficiency of the whole hybrid system 100 is increased.

In addition, if it is not determined that the required output is above the allowed maximum output preset value of fuel cell in step S2, the control unit 40 may control the internal combustion engine 31 so as to stop operation.

Figure 5A:
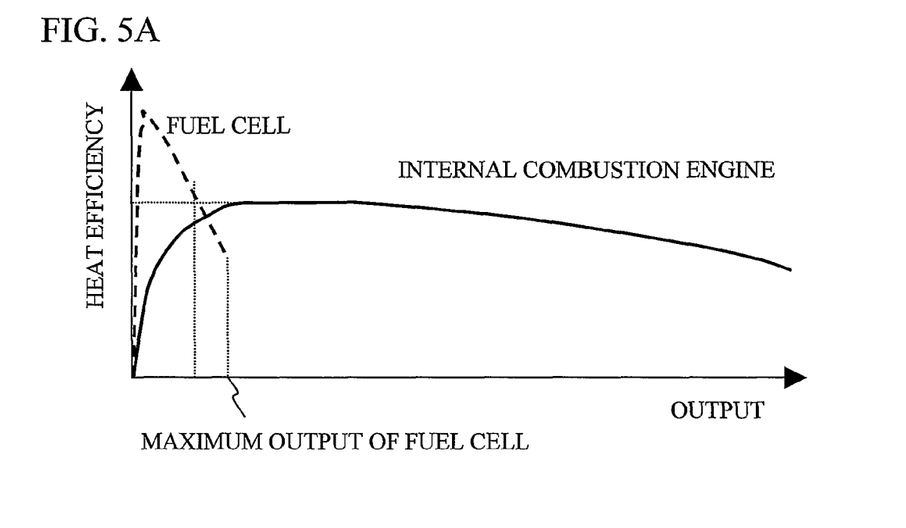
FIG. 5 illustrates another control sequence of an internal combustion engine by a control unit.
Figure 5B:
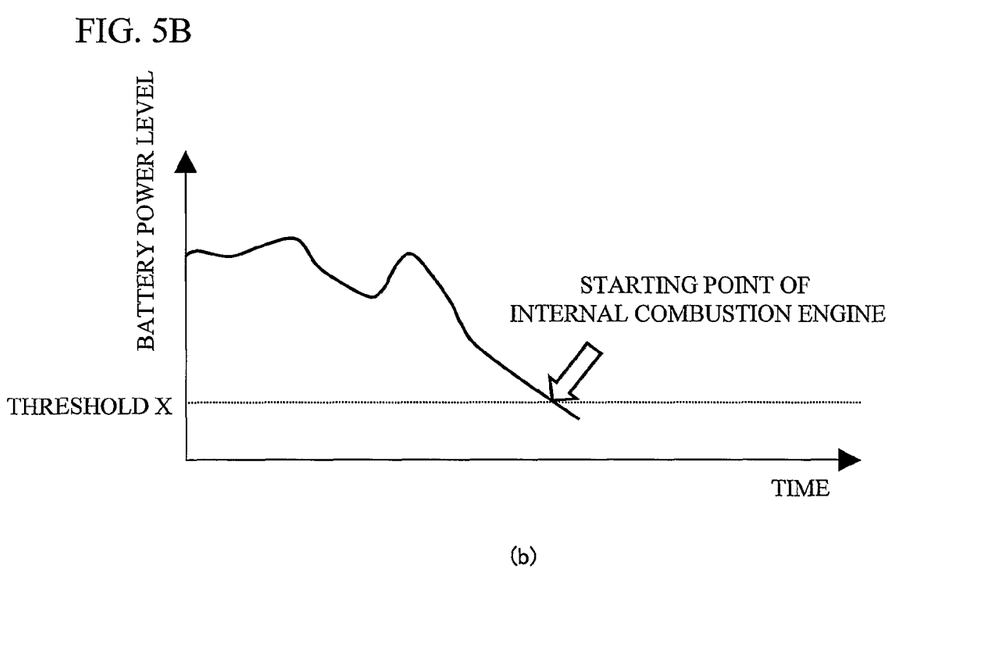

Subsequently, another control of the internal combustion engine 31 by the control unit 40 will be described below. FIG. 5 illustrates another control of the internal combustion engine 31 by the control unit 40. FIG. 5A illustrates a relationship between the required output and the operation of the storing portion 22, and FIG. 5B illustrates a relationship between the time in which the electrical power is supplied by the storing portion 22 and the battery power level of the storing portion 22. The vertical axis of FIG. 5A indicates the heat efficiency of the internal combustion engine 31 and the fuel cell 15, and the horizontal axis of FIG. 5A indicates the output of the internal combustion engine 31 and the fuel cell 15. The vertical axis of the FIG. 5B indicates the battery power level of the storing portion 22, and the horizontal axis of FIG. 5B indicates the time in which the electrical power is supplied by the storing portion 22.

As shown in FIG. 5A, the maximum output of the fuel cell 15 is relatively small. And the electrical power of the storing portion 22 is used if the required output is above the maximum output of the fuel cell 15. As shown in FIG. 5B, the battery power level decreases as the time in which the electrical power is supplied from the storing portion 22 passes. If the battery power level of the storing portion 22 is under a threshold X, the control unit 40 may control the internal combustion engine 31 so as to operate and to provide the electrical power to the storing portion 22. It is therefore possible to restrain the decrease of the life of the storing portion 22 caused by over discharge.

Figure 6:
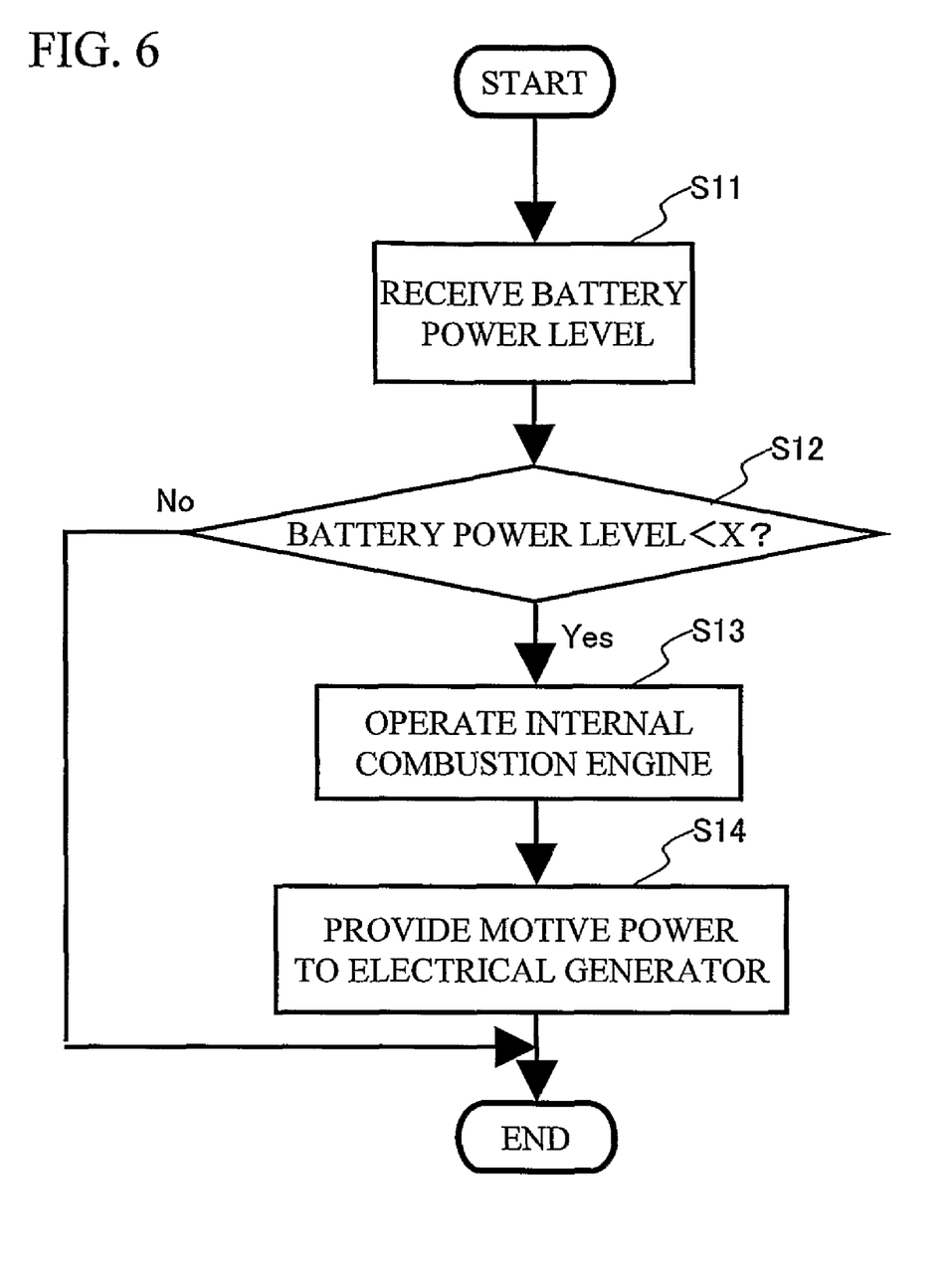
FIG. 6 illustrates flowchart of a control sequence of an operation of FIG. 5 by a control unit.

FIG. 6 illustrates flowchart of a control sequence of the operation of FIG. 5 by the control unit 40. As shown in FIG. 6, the control unit 40 may receive the battery power level of the storing portion 22 from the battery power level detecting portion 25 (step S11). Next, the control unit 40 may determine whether the battery power level of the storing portion 22 is under the threshold X (step S12). If it is determined that the battery power level of the storing portion 22 is under the threshold X in step S12, the control unit 40 may control the internal combustion engine 31 so as to operate (step S13). Then, the control unit 40 may control the output power dividing portion 33 so as to provide the motive power generated in the internal combustion engine 31 to the electrical generator 32 (step S14). In this case, the motive power generated in the internal combustion engine 31 may be provided to the wheels 36. After step S14, the control unit 40 may start the sequence over from step S11.

If it is not determined that the battery power level of the storing portion 22 is under the threshold X in step S12, the control unit 40 may start the sequence over from step S11. In addition, the control unit 40 may start the flow chart in a specific period.

As described above, when the battery power level of the storing portion 22 is low, the internal combustion engine 31 may operate and the battery power level of the storing portion 22 may increase. It is therefore possible to prevent the shortage of the battery power of the storing portion 22. Therefore, it is possible for the storing portion 22 to provide the electrical power stably to the electrical motor 34, and it is possible to restrain the decrease of the life of the storing portion 22 caused by over discharge. In addition, it is possible to restrain the unnecessary operation of the internal combustion engine 31 having low heat efficiency, and the heat efficiency of the whole hybrid system 100 is increased.

In addition, if it is not determined that the required output is above the allowed maximum output preset value of fuel cell in step S12, the control unit 40 may control the internal combustion engine 31 so as to stop operation.

Figure 7:
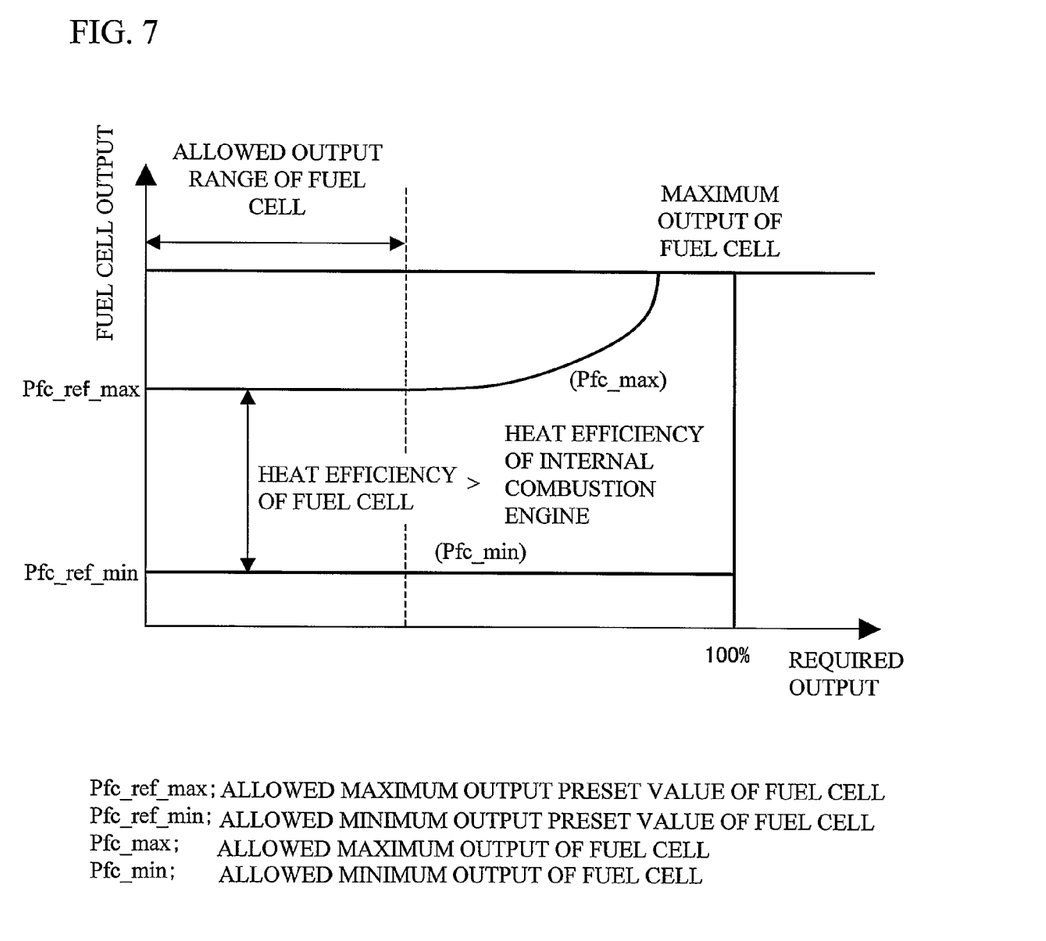
FIG. 7 illustrates a relationship between a required output and an output of a fuel cell.

Subsequently, another control sequence of the internal combustion engine 31 by the control unit 40 will be described below. FIG. 7 illustrates a relationship between the required output and the output of the fuel cell 15. The vertical axis of FIG. 7 indicates the output of the fuel cell 15, and the horizontal axis of FIG. 7 indicates the required output.

As shown in FIG. 7, the allowed minimum output of fuel cell is constant at the allowed minimum output preset value of fuel cell regardless of the required output. On the contrary, the allowed maximum output of fuel cell is constant at the allowed maximum output preset value of fuel cell regardless of the required output if the required output is in the allowed output range of fuel cell in FIG. 3, but the allowed maximum output value of fuel cell increases to the maximum output of fuel cell based on the required output if the required output is above the allowed output range of fuel cell.

Figure 8:
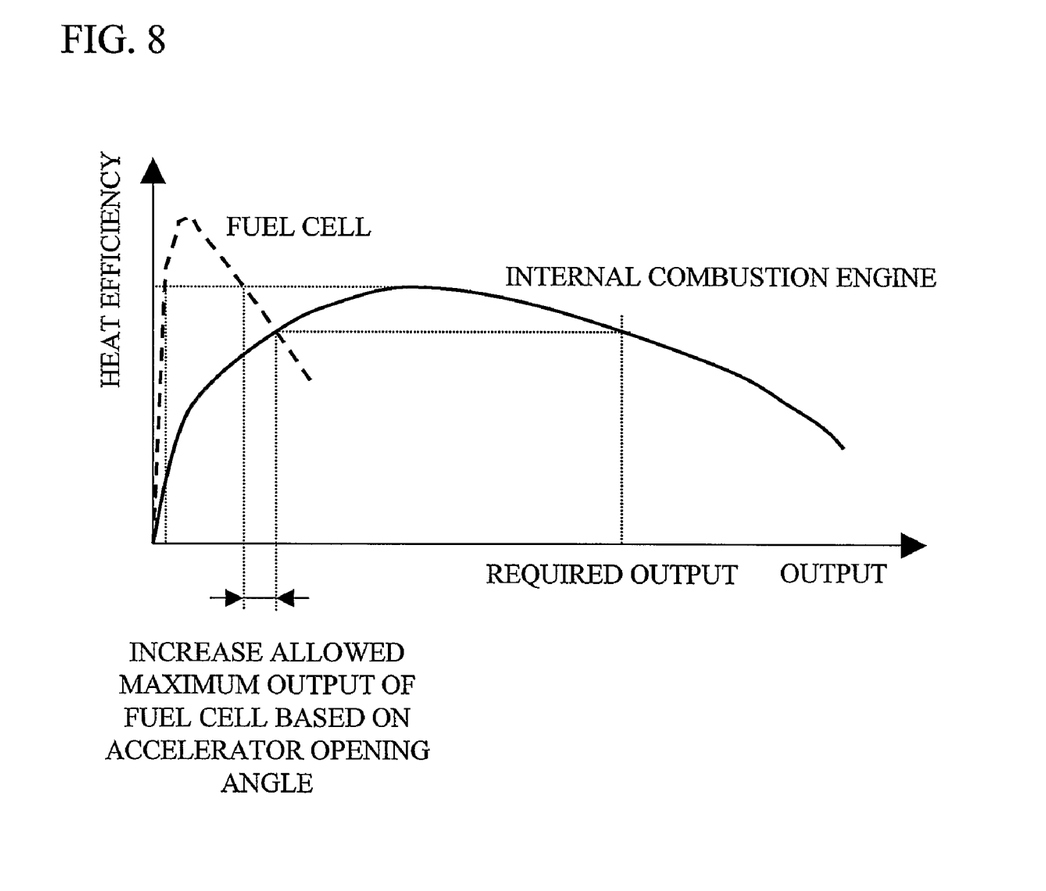
FIG. 8 illustrates a case where an allowed maximum output of fuel cell is above an allowed output range of fuel cell.

FIG. 8 illustrates a case where the allowed maximum output of fuel cell is above the allowed output range of fuel cell. The vertical axis of FIG. 8 indicates the heat efficiency of the fuel cell 15 and the internal combustion engine 31, and the horizontal axis of FIG. 8 indicates the output of the fuel cell 15 and the internal combustion engine 31. If the required output is above the allowed output range of fuel cell, the allowed maximum output of the fuel cell 15 is raised based on the required output to the heat efficiency equal to that of the internal combustion engine 31. In addition, the upper limit of the allowed maximum output of the fuel cell 15 is the maximum output of fuel cell.

As described above, the heat efficiency of the fuel cell 15 always remains the value more than the heat efficiency of the internal combustion engine 31. In addition, it is possible to take advantage at a maximum of the electrical power generated in the fuel cell 15. It is thus possible to restrain the unnecessary operation of the internal combustion engine 31. Accordingly, the heat efficiency of the whole hybrid system 100 is increased.

Figure 9:
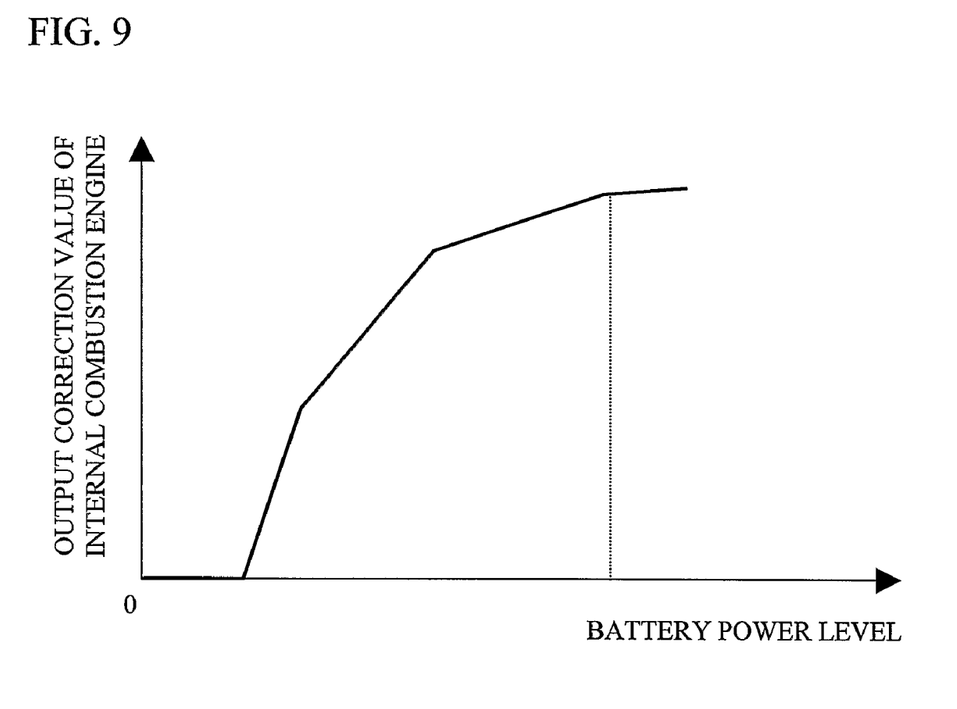
FIG. 9 illustrates a relationship between a battery power level of a storing portion and an output correction value of an internal combustion engine.

FIG. 9 illustrates a relationship between the battery power level of the storing portion 22 and the output correction value of the internal combustion engine 31. "The output correction value of the internal combustion engine 31" refers to an output subtracted from the output to be generated in the internal combustion engine 31 based on the required output. The vertical axis of FIG. 9 indicates the output correction value of the internal combustion engine 31, and the horizontal axis of FIG. 9 indicates the battery power level of the storing portion 22.

As shown in FIG. 9, the output correction value of the internal combustion engine 31 may be zero in the range where the battery power level of the storing portion 22 is low, and the output correction value of the internal combustion engine 31 may increase as the battery power level increases if the battery power level is above the predetermined value. In this way, if the battery power level of the storing portion 22 is low, the storing portion 22 may be charged by the output of the internal combustion engine 31. In addition, if the battery power level of the storing portion 22 is high, the output of the internal combustion engine 31 may be restrained and the electrical power from the storing portion 22 may be used.

For example, the output correction value may be 0 kW if the battery power level of the storing portion 22 is in a range 0% to 30%, and the output correction value may be 5 kW if the battery power level of the storing portion 22 is half of the storage capacity.

As described above, it is possible to restrain the unnecessary operation of the internal combustion engine 31 by taking advantage at a maximum of the electrical power of the storing portion 22, and is possible to charge the storing portion 22 by the operation of the internal combustion engine 31 in a case where the electrical power of the storing portion 22 runs short. It is therefore possible to prevent the decrease of the life of the storing portion 22 caused by over discharge. In addition, the heat efficiency of the whole hybrid system 100 is increased.

Figure 10:
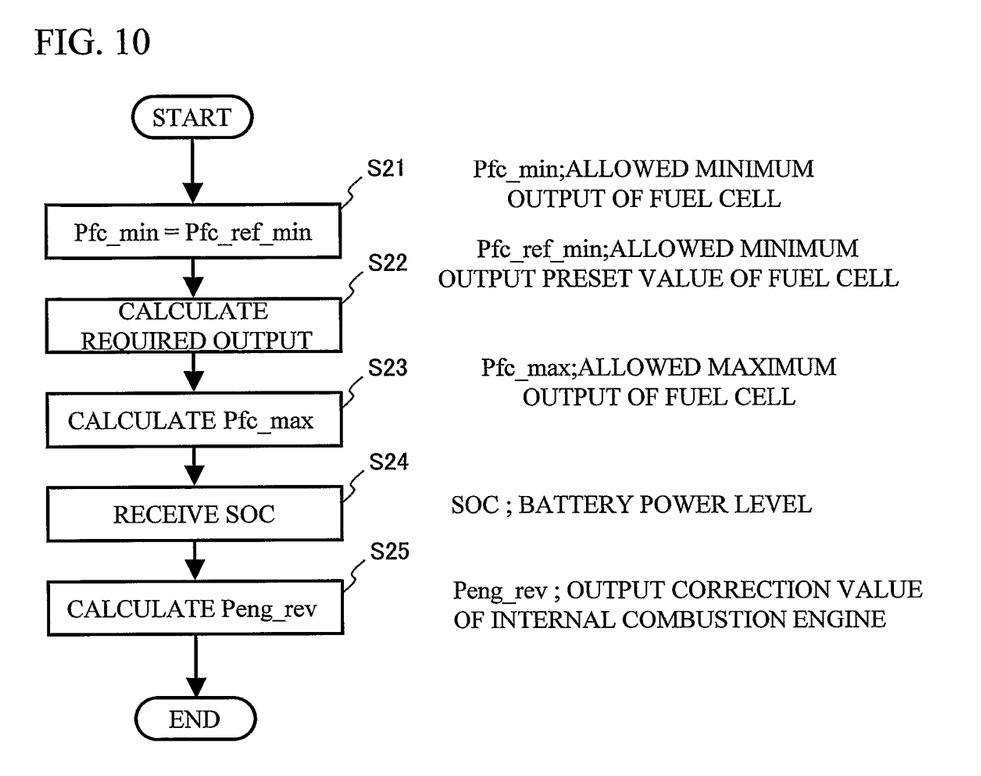
FIG. 10 illustrates flowchart of a control of FIG. 7 through FIG. 9.

FIG. 10 illustrates flowchart of a control of FIG. 7 through FIG. 9 by the control unit 40. As shown in FIG. 10, the control unit 40 may set the allowed minimum output of fuel cell to the allowed minimum output preset value of fuel cell (step S21). Next, the control unit 40 may calculate the required output (step S22). In this case, the control unit 40 may calculate the required output from the accelerator opening angle of the accelerator 37 based on FIG. 2.

Then, the control unit 40 may set the allowed maximum output of fuel cell based on the calculated required output and the graph of FIG. 7 (step S23). Next, the control unit 40 may receive the battery power level of the storing portion 22 (step S24). Then, the control unit 40 may calculate the output correction value of the internal combustion engine based on the graph of FIG. 9 (step S25). After step S25, the control unit 40 may start the sequence over from step S21.

As described above, the heat efficiency of the fuel cell 15 always remains a value more than the heat efficiency of the internal combustion engine 31. In addition, it is possible to take advantage at a maximum of the electrical power generated in the fuel cell 15 and the electrical power from the storing portion 22. Further, it is possible to restrain the unnecessary operation of the internal combustion engine 31, and is possible to charge the storing portion 22 by the operation of the internal combustion engine 31 in a case where the electrical power of the storing portion 22 runs short. It is therefore possible to prevent the decrease of the life of the storing portion 22 caused by over discharge. In addition, the heat efficiency of the whole hybrid system 100 is increased.

In addition, the control unit 40 may operate the flowchart every several milliseconds to several tens milliseconds. For example, the control unit 40 may operate the flowchart mentioned above every 48 milliseconds.

Figure 11:
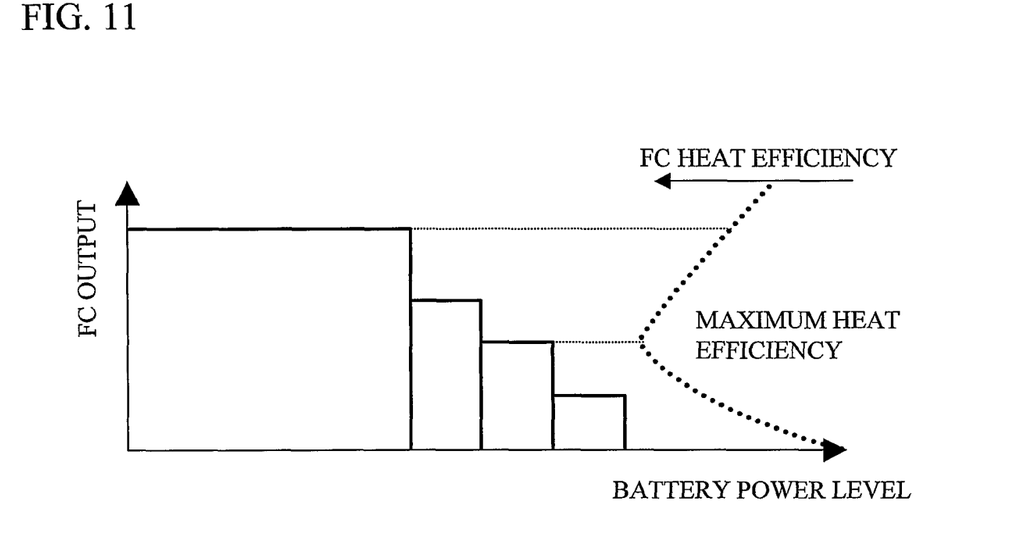
FIG. 11 illustrates a relationship between a battery power level of a storing portion and an output of a fuel cell.

Subsequently, the output of the fuel cell 15 will be described. FIG. 11 illustrates a relationship between the battery power level of the storing portion 22 and the output of the fuel cell 15. The vertical axis of FIG. 11 indicates the output of the fuel cell 15, and the horizontal axis of FIG. 11 indicates the battery power level of the storing portion 22. As shown in FIG. 11, the fuel cell 15 may output so that the output value of the fuel cell 15 is equal to one of the output values set in advance based on the battery power level of the storing portion 22. This set value is reduced in incremental steps as the battery power level increases, and is zero if the battery power level of the storing portion 22 exceeds a predetermined value. The fuel cell 15 therefore does not generate electrical power in a case where the storing portion 22 is charged sufficiently. Accordingly, the heat efficiency of the whole hybrid system 100 is increased.

In addition, if the maximum heat efficiency of the fuel cell 15 is one of the predetermined values mentioned above, it is possible to take advantage of the output of the fuel cell 15 at maximum heat efficiency. The output value of the fuel cell 15 may increase in incremental steps based on the required output, the opening angle of the accelerator 37 or the like.

In addition, it is prevented that a delay in response of reactant gas flow of the fuel cell 15 caused by a rapid change of the required output occurs, because it is not necessary to control the output of the fuel cell 15 continuously. Further, it is possible to keep the generating efficiency of the fuel cell 15 at a theoretical figure, because the reactant gas flow is stabilized. In addition, it is prevented that the electrical requirement of a pump that provides the reactant gas to the fuel cell 15 is excessive, because it is not necessary to correct the overshoot of the pump. In particular, the effect mentioned above is enlarged when the reforming portion 13 generates fuel gas, as this embodiment.

The output of the fuel cell 15 described in FIG. 15 is one example. The fuel cell 15 may output in another way. For example, the control unit 40 may control the fuel cell 15 so as to output continuously based on the battery power level of the storing portion 22.

The fuel cell 15 may output at maximum heat efficiency when the required output is under the output at the maximum heat efficiency. In this case, the fuel cell 15 outputs electrical power more than the required output, and the fuel cell 15 can provide the excessive electrical power to the storing portion 22. The fuel cell 15 therefore provides electrical power to the storing portion 22 at maximum heat efficiency. Accordingly, the heat efficiency of the whole hybrid system 100 is increased.

In addition, the fuel cell 15 may output at the maximum heat efficiency when the required output is under the output at the maximum heat efficiency. In this case, the electrical power from the storing portion 22 is used for the deficiency of the output of the fuel cell 15. And the heat efficiency of the whole hybrid system 100 is increased because the fuel cell 15 generates electrical power at the maximum heat efficiency.

In this embodiment, the control unit 40 corresponds to the determination portion and the control portion, the threshold X corresponds to the threshold, and the allowed output range of fuel cell corresponds to the predetermined output range.

Throughout the following description, numerous specific concepts and structures are set forth in order to provide a thorough understanding of the invention. The invention can be practiced without utilizing all of these specific concepts and structures. In other instances, well known elements have not been shown or described in detail, so that emphasis can be focused on the invention.

The hybrid system according to one or more aspects of the invention may include an electrical motor, a storing portion, a fuel cell, an internal combustion engine, a determination portion and a control portion. The electrical motor may generate motive power. The storing portion may provide electrical power to the electrical motor. The fuel cell may provide electrical power to the electrical motor or the storing portion within a predetermined output range. The internal combustion engine may absorb loading of the fuel cell. The determination portion may determine whether the loading of the fuel cell is above the maximum output in the predetermined range. The control portion may control the internal combustion engine so as to operate if it is determined that the loading of the fuel cell is above the maximum output in the predetermined range.

In exemplary embodiments, the electrical power generated in the fuel cell operating within the predetermined output range may be provided to the storing portion or the electrical motor, and the internal combustion engine may absorb the loading of the fuel cell if the loading of the fuel cell is above the maximum output of the predetermined range. It is thus possible to make up for the deficiency of the output of the fuel cell with that of the internal combustion engine and is possible to fill the loading of the fuel cell stably, even if the loading of the fuel cell is above the maximum output of the fuel cell.

In exemplary embodiments, the determination portion may determine that the loading of the fuel cell is above the maximum output in the predetermined range if the battery power level of the storing portion decreases. In this case, the battery power level of the storing portion increases because of the operation of the internal combustion engine, even if the battery power level of the storing portion decreases. It is therefore possible to prevent the shortage of the battery power of the storing portion.

In exemplary embodiments, the predetermined range may be the range where heat efficiency of the fuel cell is above the maximum heat efficiency of the internal combustion engine. In this case, the fuel cell may operate at higher heat efficiency. And the heat efficiency of the whole hybrid system is increased.

In exemplary embodiments, the hybrid system may further include a battery power level detecting portion that detects the battery power level of the storing portion. And the control portion may control the internal combustion engine so as to stop operation if the battery power level of the storing portion is more than a threshold, and may control the internal combustion engine so as to start operation if the battery power level of the storing portion is under the threshold. In this case, the battery power level of the storing portion is increased because of the operation of the internal combustion engine when the battery power level is low. And it is prevented that the battery power of the storing portion runs short. It is thus possible to achieve stable supply of electrical power to the electrical motor from the storing portion, and is possible to restrain the decrease of the life of the storing portion caused by over discharge. In addition, the unnecessary operation of the internal combustion engine having low heat efficiency is restrained. And the heat efficiency of the whole hybrid system is increased.

In the exemplary embodiments, the control portion may reset the maximum output of the predetermined range to higher side value, if the heat efficiency of the internal combustion engine is under that of the fuel cell operating in a range the maximum output of the predetermined range to the maximum output of the fuel cell. In this case, it is possible to take advantage at a maximum of the electrical power generated in the fuel cell. In addition, it is possible to restrain the unnecessary operation of the internal combustion engine. Therefore, the efficiency of the whole hybrid system is increased.

In the exemplary embodiments, the heat efficiency of the internal combustion may be a ratio of an output to be provided to the electrical motor or the storing portion from the internal combustion engine to an energy used by the internal combustion engine. In this case, it is possible to increase the heat efficiency of the whole hybrid system more appropriately.

In the exemplary embodiments, the heat efficiency of the internal combustion may be a ratio of an output to be provided to the electrical motor through the storing portion from the fuel cell to an energy used by the internal combustion engine. In this case, it is possible to increase the heat efficiency of the whole hybrid system more appropriately.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications, variations, improvements, and/or substantial equivalents.

The invention claimed is:

1. A hybrid system comprising:
   an electrical motor generating motive power;
   a storing portion providing electrical power to the electrical motor;
   a fuel cell that provides electrical power to the storing portion or both the electrical motor and the storing portion within a predetermined output range;
   an internal combustion engine outputting to loading of the electrical motor;
   a determination portion that determines whether a required output of the electrical motor is above a maximum output in the predetermined output range; and
   a control portion that controls the internal combustion engine so as to operate if it is determined that the required output of the electrical motor is above the maximum output in the predetermined output range,
   wherein the predetermined output range is the range where a heat efficiency of the fuel cell is above a maximum heat efficiency of the internal combustion engine,
   a heat efficiency of the internal combustion engine is a ratio of an output to be provided to the electrical motor or the storing portion from the internal combustion engine to an energy used by the internal combustion engine, and the heat efficiency of the fuel cell is a ratio of an output to be provided to the electrical motor through the storing portion from the fuel cell to an energy used by the fuel cell.

2. The hybrid system claimed in claim 1, wherein the determination portion determines that the required output of the electrical motor is above the maximum output in the predetermined output range if a battery power level of the storing portion decreases in a case where electrical power is provided to the storing portion from the fuel cell and electrical power is provided to the electrical motor from the storing portion.

3. The hybrid system claimed in claim 1 further comprising a battery power level detecting portion that detects a battery power level of the storing portion, wherein the control portion controls the internal combustion engine so as to stop operation if the battery power level of the storing portion is more than a threshold, and controls the internal combustion engine so as to start operation if the battery power level of the storing portion is under the threshold.

4. The hybrid system claimed in claim 1, wherein the control portion resets the maximum output in the predetermined range to a higher side value, if the heat efficiency of the internal combustion engine is under that of the fuel cell operating in a range of the maximum output in the predetermined range, to a maximum output of the fuel cell.

5. The hybrid system claimed in claim 1, wherein output of the fuel cell is set to be stepwise values according to the required output.

* * * * *